United States Patent
Kim et al.

(10) Patent No.: US 10,187,554 B2
(45) Date of Patent: Jan. 22, 2019

(54) COVER PHOTOGRAPHY APPARATUS, PORTABLE TERMINAL APPARATUS AND CONTROL METHOD OF COVER PHOTOGRAPHY APPARATUS

(71) Applicant: SAMSUNG ELECTRONICS CO., LTD., Suwon-si (KR)

(72) Inventors: Tae-kyun Kim, Suwon-si (KR); Jum-han Bae, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 113 days.

(21) Appl. No.: 14/823,146

(22) Filed: Aug. 11, 2015

(65) Prior Publication Data
US 2016/0100081 A1 Apr. 7, 2016

(30) Foreign Application Priority Data
Oct. 1, 2014 (KR) ........................ 10-2014-0132644

(51) Int. Cl.
*H04N 5/225* (2006.01)
*H04N 5/232* (2006.01)

(52) U.S. Cl.
CPC ....... *H04N 5/2252* (2013.01); *H04N 5/23258* (2013.01); *H04N 5/23267* (2013.01)

(58) Field of Classification Search
None
See application file for complete search history.

(56) References Cited

U.S. PATENT DOCUMENTS 6,272,290 B1* 8/2001 Mogamiya ............ G03B 17/48
  348/64
7,102,686 B1* 9/2006 Orimoto ................ G03B 35/08
  348/231.7

(Continued)

FOREIGN PATENT DOCUMENTS

KR 10-2011-0058119 A 6/2011
KR 10-2012-0046879 A 5/2012

(Continued)

OTHER PUBLICATIONS

"Comparison of New Concept Smart Cameras—Sony QX10 VS QX100 Smart Review", www.sony.co.kr; sales price: QX10—289,000 KRW / QX100—589,000 KRW, Dec. 2013, total 14 pages.

(Continued)

*Primary Examiner* — Jason A Flohre
*Assistant Examiner* — Dwight Alex C Tejano
(74) *Attorney, Agent, or Firm* — Sughrue Mion, PLLC

(57) ABSTRACT

Provided herein is a cover photography apparatus, portable terminal apparatus, and a control method of the cover photography apparatus, the cover photography apparatus including an imaging device configured to generate image data; a communicator configured to receive motion information from a portable terminal apparatus; and a controller configured to: determine that the image data is captured during motion of the cover photography apparatus based on the motion information, and correct the image data in response to determining that the image data is captured during motion of the cover photography apparatus; and control the communicator to transmit the corrected image data to the portable terminal apparatus.

15 Claims, 9 Drawing Sheets

(56) References Cited

U.S. PATENT DOCUMENTS

| | | | |
|---|---|---|---|
| 8,913,139 B2 | 12/2014 | Park et al. | |
| 2008/0152332 A1* | 6/2008 | Koo | H04N 5/23248 396/55 |
| 2011/0102668 A1* | 5/2011 | Kaga | G03B 17/14 348/374 |
| 2011/0234825 A1 | 9/2011 | Liu et al. | |
| 2012/0270599 A1* | 10/2012 | Mori | H04M 1/72527 455/556.1 |
| 2012/0282977 A1* | 11/2012 | Haleluk | H04B 1/3888 455/556.1 |
| 2014/0132781 A1* | 5/2014 | Adams | H04N 5/2254 348/207.1 |
| 2014/0152777 A1* | 6/2014 | Galor | H04N 5/2254 348/47 |
| 2014/0253742 A1* | 9/2014 | Ishii | H04N 5/23245 348/207.1 |
| 2014/0300809 A1* | 10/2014 | Oliveira | H04N 5/232 348/376 |
| 2014/0347503 A1* | 11/2014 | Endo | H04N 5/23203 348/207.11 |
| 2015/0049202 A1* | 2/2015 | Okabe | G03B 17/02 348/207.1 |
| 2016/0048216 A1* | 2/2016 | Fink | H04N 5/144 345/156 |
| 2016/0219197 A1* | 7/2016 | Barros | H04N 5/2252 |

FOREIGN PATENT DOCUMENTS

| | | |
|---|---|---|
| KR | 10-2013-0092892 A | 8/2013 |
| KR | 10-2014-0035672 A | 3/2014 |

OTHER PUBLICATIONS

Paul Ridden, "Slide a camera onto your iPhone with ladibird", gizmag, http://www.gizmag.com/ladibird-iphone5-camera-lens/28868/, Aug. 29, 2013, total 6 pages.

* cited by examiner

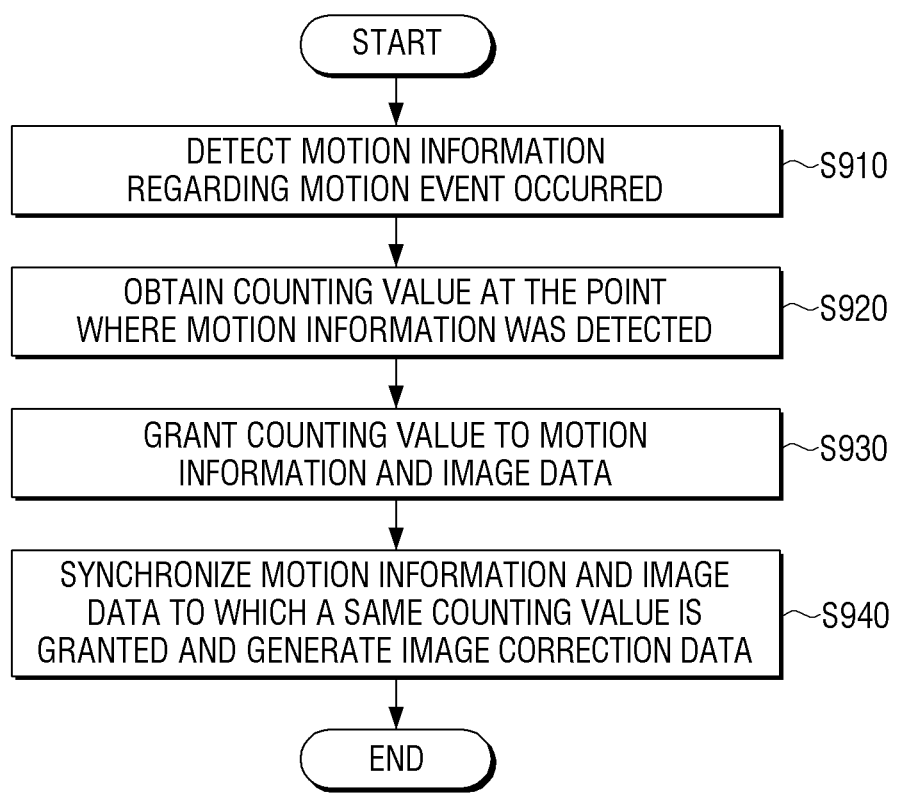

COVER PHOTOGRAPHY APPARATUS, PORTABLE TERMINAL APPARATUS AND CONTROL METHOD OF COVER PHOTOGRAPHY APPARATUS

CROSS-REFERENCE TO RELATED APPLICATION

This application claims priority from Korean Patent Application No. 10-2014-0132644, filed in the Korean Intellectual Property Office on Oct. 1, 2014, the entire disclosure of which is incorporated herein by reference.

BACKGROUND

1. Field

Methods and apparatuses consistent with the exemplary embodiments relate to a cover photography apparatus, a portable terminal apparatus and a control method of the cover photography apparatus, and more particularly to a cover photography apparatus and a portable terminal apparatus capable of performing image correction, and an image correction method of the cover photography apparatus.

2. Description of Related Art

A conventional portable terminal apparatus that is capable of photographing an image, such as a smart phone, is provided with a motion sensor, such as a gyro sensor, and may thus perform correction on a noisy image generated by trembling, based on motion information sensed by such the motion sensor.

However, such a portable terminal apparatus generally produces a low quality image, compared to general photographing apparatuses, as it performs various multimedia operations.

Therefore, supplemental photography apparatuses are needed that may provide better performance than portable terminal apparatuses, cost less than general photography apparatuses, and are portable. Such a supplemental photography apparatus may be physically connected to a portable terminal apparatus to perform photographing operations according to a control command by the portable terminal apparatus.

SUMMARY

Methods and apparatuses consistent with exemplary embodiments relate to a cover photography apparatus connected to a portable terminal apparatus.

According to an aspect of an exemplary embodiment, a cover photography apparatus includes: an imaging device configured to generate image data; a communicator configured to receive motion information from a portable terminal apparatus; and a controller configured to: determine that the image data is captured during motion of the cover photography apparatus based on the motion information, and correct the image data in response to determining that the image data is captured during motion of the cover photography apparatus; and control the communicator to transmit the corrected image data to the portable terminal apparatus.

The apparatus may further include a timer configured to generate time values, and the controller may be further configured to: correlate a time value with corresponding motion information for a plurality of time values; integrate the correlated time value into each of the corresponding motion information and corresponding image data input at the time value corresponding to the detected motion information; and synchronize the corresponding motion information with the corresponding image data to generate the corrected image data.

The corrected image data may be corrected based on the synchronized corresponding motion information or an uncorrected source data that includes the synchronized corresponding motion information and the corresponding image data.

The communicator may be further configured to receive correction data based on the motion information and a distance between an image sensor of the imaging device and a sensor configured to detect the motion information from the portable terminal apparatus, and the controller may be further configured to generate the corrected image data that based on the correction data.

The corrected image data may be corrected based on the synchronized corresponding motion information and the corrected motion data, or an uncorrected source data that includes the synchronized corresponding motion information, the image data and the corrected motion data.

The apparatus may further include: a housing configured to connect to the portable terminal apparatus such that one surface of the portable terminal apparatus may be exposed, and including a hole configured to expose a lens of the connected portable terminal apparatus; and a lens formed on one surface of the housing, and configured to be protrudable outside the housing. The communicator may be further configured to receive a driving signal and the lens is driven according to the driving signal.

According to an aspect of an exemplary embodiment, a portable terminal apparatus includes: an imaging device configured to generate image data; a sensor configured to generate motion information of the portable terminal apparatus; a communicator configured to perform data communication with a cover photography apparatus; and a controller configured to control the communicator, in response to a photograph command being input to the portable terminal apparatus, to transmit the motion information to the cover photography apparatus.

The controller may be further configured to: determine correction data based on the motion information and a distance between an image sensor of the imaging device and the sensor; and control the communicator to transmit the correction data.

The apparatus may further include a display configured to display an image based on at least one of the image data from the imaging device and received image data from the cover photography apparatus, and the controller may be further configured to: in response to the image data from the imaging device being input, correct the input image data based on correction data determined based on motion information corresponding to a time the image data was photographed and a distance between an image sensor of the imaging device and the sensor, and control the display to display the same; and in response to receiving an uncorrected source data that includes the image data, motion information, and corrected data from the cover photography apparatus, correct the image data based on the motion information and corrected data included in the uncorrected source data, and control the display to display the same.

The display may include a first area for displaying a first control user interface for receiving a first control command related to the imaging device, and a second area for displaying a second control user interface for receiving a second control command related to the cover photography apparatus.

According to an aspect of an exemplary embodiment, a method of controlling a cover photography apparatus includes: receiving image data photographed through the cover photography apparatus; receiving motion information from a connected portable terminal apparatus; synchronizing the received motion information and the input image data to generate corrected image data; and transmitting the generated corrected image data to the portable terminal apparatus.

The method may further include timing in response to at least one of the image data received from the imaging device and the motion information received from the portable terminal apparatus being input, wherein the generating the corrected image data includes: analyzing motion information received from the portable terminal apparatus to correlate a time value with corresponding motion information; integrating the correlated time value into the corresponding motion information and corresponding image data input at the time value corresponding to the detected motion information; and synchronizing the received motion information and the input image data to which a same time value was correlated to generate the corrected image data.

The corrected image data may be corrected based on the synchronized corresponding motion information or an uncorrected source data that includes the synchronized corresponding motion information and the corresponding image data.

The receiving may further include receiving correction data based on the motion information and a distance between an image sensor of the imaging device and a sensor configured to detect the motion information from the portable terminal apparatus, and the generating may further include generating corrected image data including the correction data.

The corrected image data may be corrected based on the synchronized corresponding motion information and the corrected motion data or an uncorrected source data that includes the synchronized corresponding motion information, the image data, and the corrected motion data.

The cover photography apparatus may be connected to the portable terminal apparatus such that a surface of the portable terminal apparatus is exposed through a housing formed such that a lens formed on the portable terminal apparatus is exposed, and the receiving, in response to a lens of the housing protruding outside the housing according to a driving signal received from the portable terminal apparatus, may include capturing image data through the photographer.

As aforementioned, according to the present disclosure, a portable photography apparatus and cover photography apparatus may correct a photographed image without having a separate sensor for sensing a motion.

BRIEF DESCRIPTION OF THE DRAWINGS

The above and/or other aspects will be more apparent by describing certain present disclosure with reference to the accompanying drawings, in which:

FIG. 9 is a flowchart of a method of generating corrected image data in a cover photography apparatus according to another exemplary embodiment.

DETAILED DESCRIPTION

Figure 1:
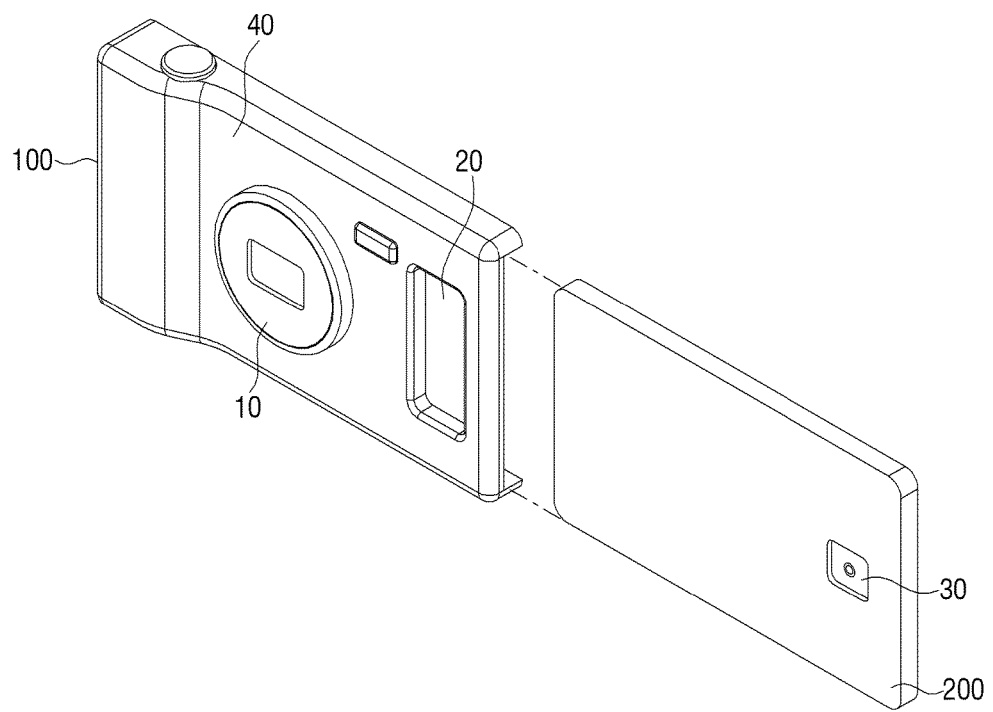
FIG. 1 is a view illustrating a portable terminal apparatus being connected to a cover photography apparatus according to an exemplary embodiment.

Certain exemplary embodiments are described in detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions may not described in detail since they would obscure the application with unnecessary detail. Expressions such as "at least one of," when preceding a list of elements, modify the entire list of elements and do not modify the individual elements of the list.

FIG. 1 is an exemplary view illustrating a portable terminal apparatus being connected to a cover photography apparatus according to an exemplary embodiment.

As illustrated in FIG. 1, the cover photography apparatus 100 may be connected to a portable terminal apparatus 200 and photograph an image.

According to the exemplary embodiment, the cover photography apparatus 100 may be connected to the portable terminal apparatus 200 in a sliding manner. Herein, the cover photography apparatus 100 and portable terminal apparatus 200 are apparatuses that may photograph images. Such a cover photography apparatus 100 may have higher image photography performance than the portable terminal apparatus 200, and may perform photographing operations according to a control command received from the portable terminal apparatus 200.

As such, when the portable terminal apparatus 200 is connected, the cover photography apparatus 100 may receive a control command related to photographing from the portable terminal apparatus 200 through at least one of a physical connection or a wireless connection. Specifically, a housing 40 of the cover photography apparatus 100 may be formed such that one surface of a connected portable terminal apparatus 200 remains accessible to the user when connected to the cover photography apparatus 100. Herein, the one surface of the portable terminal apparatus 200 may be an area configured to display an image photographed through the portable terminal apparatus 200, and may include a display area of a touch screen through which a photographing command may be input.

Meanwhile, in the housing 40 of the cover photography apparatus 100, a hole 20 may be formed such that a lens 30 formed on another surface of the portable terminal apparatus 200 may be unobscured by the attached cover photography apparatus. Therefore, when the portable terminal apparatus 200 is connected to the housing 40 of the cover photography apparatus 200, an image may be photographed through the lens 30 of the portable terminal apparatus 200 or a lens 10 of the cover photography apparatus 100, according to a user's control command.

Meanwhile, the cover photography apparatus 100 may be connected to one portable terminal apparatus 200, but there is no limitation thereto, and thus the cover photography apparatus 100 may be connected to a plurality of portable terminal apparatuses 200 at the same time. As such, in the case where the cover photography apparatus 100 is connected to the plurality of portable terminal apparatuses 200, the cover photography apparatus 100 may perform a photographing operation of a lens driving mode according to a control command related to photography received from at least one portable terminal apparatus 200 of the plurality of portable terminal apparatuses 200 connected to the cover photography apparatus 100.

Figure 2:
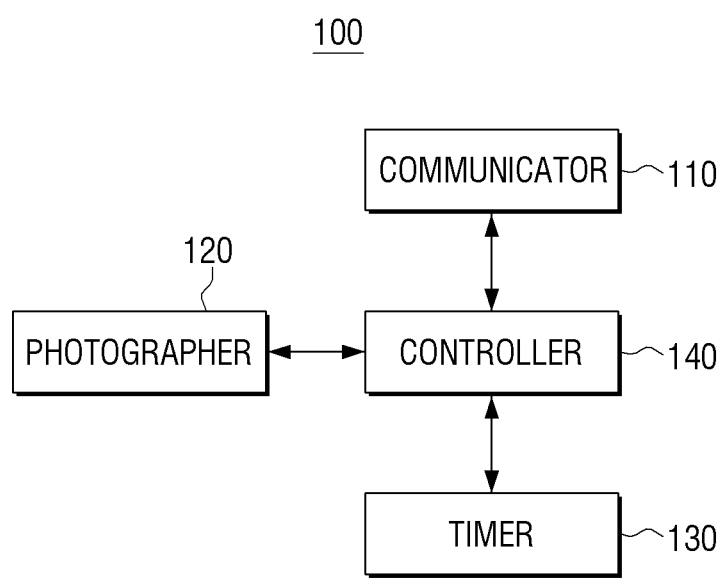
FIG. 2 is a block diagram of a cover photography apparatus according to an exemplary embodiment.

FIG. 2 is a block diagram of a cover photography apparatus according to an exemplary embodiment.

As illustrated in FIG. 2, the cover photography apparatus 100 may include a communicator 110, photographer 120, timer 130, and controller 140.

The communicator 110 may perform wired or wireless data communication with the at least one portable terminal apparatus 200 and receive a control command related to photography. Specifically, the communicator 110 may receive a plurality of motion information sensed through a sensor 210 provided in the at least one portable terminal apparatus 200. According to an exemplary embodiment, the communicator 110 may be realized as a short distance communication module that includes at least one of a WiFi direct communication module, Bluetooth module, IrDA (infrared data association) module, NFC (Near Field Communication) module, and Zigbee module.

However, the present disclosure is not limited thereto, and thus the communicator 110 may be realized as not only a short distance communication module, but also as a remote communication module that includes at least one of a cellular communication module, 3G (3rd generation) mobile communication module, 4G (4th generation) mobile communication module, and 4G LTE (Long Term Evolution) communication module.

Meanwhile, in the case that the cover photography apparatus 100 is physically connected to the at least one portable terminal apparatus 200, the communicator 110 may include a USB module, and may be physically connected to a USB module provided in the portable terminal apparatus 200. The communicator 110 may receive a control command related to photography or motion information through the USB module.

Meanwhile, in the case that the cover photography apparatus 100 is physically connected to the plurality of portable terminal apparatuses 200 through the USB module, the communicator 110 may include as many USB modules as the number of the plurality of portable terminal apparatuses 200.

The photographer 120 is a means for photographing an image. The photographer 120 converts an external light into an electric signal. The external light may pass through a lens 10. Herein, the lens 10 may be an exchangeable lens or an embedded type lens that may perform zoom-in/zoom-out functions. The lens 10 may be driven according to a driving command received from the portable terminal apparatus 200. When the external light is incident on a photographing surface, the photographer 120 converts the incident light into an electric signal using an image sensor such as a CCD (Charge Coupled Device) and CMOS (Complementary Metal Oxide Semiconductor). Therefore, the controller 140 image-processes image data corresponding to the electric signal converted by the photographer 120, generates a live image, and transmits the generated live image to the portable terminal apparatus 200 through the communicator 110.

Such a controller 140 synchronizes a plurality of motion information received from the portable terminal apparatus 200 through the communicator 110 with the plurality of image data (aforementioned live image) photographed through the photographer 120, based on a counting value counted through the timer 130, to generate corrected image data. Then, the controller 140 transmits the corrected image data, generated based on the plurality of motion information and the plurality of image data, to the portable terminal apparatus 200 through the communicator 110. Accordingly, the portable terminal apparatus 200 may display a live image, corrected based on the corrected image data received from the cover photography apparatus 100, on a screen.

Specifically, with the photographer 120 activated according to a photographing command, when at least one of the motion information received from the portable terminal apparatus 200 through the communicator 110 and the image data photographed through the photographer 120 is initially input, the controller 140 controls the timer 130 to perform a counting operation.

While the counting operation is performed through the timer 130, the controller 140 analyzes the plurality of motion information being sequentially input and determines whether there is information corresponding to a motion of a motion event. Herein, the motion information may be an information when a motion is sensed by the sensor 210, such as a gyro sensor, provided in the portable terminal apparatus 200 connected to the cover photography apparatus 100. Therefore, the controller 140 may analyze a motion information being input sequentially and determine whether motion occurred in the portable terminal apparatus 200 connected to the cover photography apparatus 100.

When it is determined that a motion event occurred, the controller 140 obtains a counting value counted through the timer 130 at a point when the motion event occurred. Furthermore, the controller 140 correlates the pre-obtained counting value to the image data input at the point when the motion event occurred and to the motion information when the motion event was detected. Accordingly, a same counting value may be correlated to the motion information when the motion event was detected and the image data input at the point when the motion information was detected. Therefore, the controller 140 may synchronize the motion information and image data to which a same counting value has been correlated, to generate corrected image data.

Herein, the corrected image data may be the image data synchronized with the motion information and corrected based on the synchronized motion information, or an uncorrected source data that includes the synchronized motion information and the image data.

According to an exemplary embodiment, a same counting value may be correlated to a first motion information and first image data. In this case, the controller 140 corrects the first image data based on the first motion information. Then, the controller 140 transmits the corrected image data that includes the corrected data corresponding to the corrected first image data to the portable terminal apparatus 200. Accordingly, the portable terminal apparatus 200 may display a corrected live image corresponding to the first image data on the screen.

According to another exemplary embodiment, a same counting value may be correlated to the first motion information and first image data. In this case, the controller 140 transmits the first motion information and first image data to which the same counting value has been correlated to the portable terminal apparatus 200. Accordingly, the portable terminal apparatus 200 may correct the first image data based on the first motion information included in the received corrected image data, and display the live image of the corrected first image data on the screen.

Meanwhile, according to an additional aspect, the communicator 110 may further receive a corrected data from the portable terminal apparatus 200. Herein, the corrected data may be an offset information pre-computed based on an information on a distance between an image sensor of the photographer 120 of the cover photography apparatus 100 and the sensor 210 provided in the portable terminal apparatus 200 that detects a motion information. Therefore, when such a corrected data is received, the controller 140 may generate corrected image data that includes the corrected data.

Herein, the corrected image data may be the image data synchronized with the motion information and corrected based on the synchronized motion information and the corrected data, or an uncorrected source data that includes the synchronized motion information, the image data, and the corrected data.

According to an exemplary embodiment, a same counting value may be correlated to the first motion information and first image data. In this case, the controller 140 corrects the first image data based on the first motion information and corrected data. Then, the controller 140 transmits the corrected image data, including the corrected data regarding the corrected first image data, to the portable terminal apparatus 200. Accordingly, the portable terminal apparatus 200 may display a corrected live image.

According to another exemplary embodiment, a same counting value may be correlated to the first motion information and first image data. In this case, the controller 140 transmits the corrected image data that includes the first motion information and first image data to which the same counting value has been correlated, and a corrected data to the portable terminal apparatus 200. Accordingly, the portable terminal apparatus 200 may correct the first image data based on the first motion information and corrected data included in the received corrected image data, and display a live image of the corrected first image data on the screen.

Meanwhile, as aforementioned, in the case that a plurality of portable terminal apparatuses 200 are connected inside the housing 40 of the cover photography apparatus 100, and in the case that a motion information is received from at least one portable terminal apparatus 200 of the plurality of portable terminal apparatuses 200 or an image data photographed through the photographer 120 is input, the timer 130 may perform a counting operation according to a control command of the controller 140. When a motion information is sequentially input from at least one portable terminal apparatus of the plurality of portable terminal apparatuses 200 with the counting operation performed through the timer 130, the controller 140 may perform a series of operations as aforementioned and grant a counting value of a point when the motion event occurred to the image data input at the point when the motion event occurred and to the motion information when the motion event was detected, and synchronize the motion information and image data to which the same counting value has been correlated, and generate corrected image data.

Hereinafter, operations of generating corrected image data in the cover photography apparatus 100 according to the present disclosure will be explained in detail.

Figure 3:
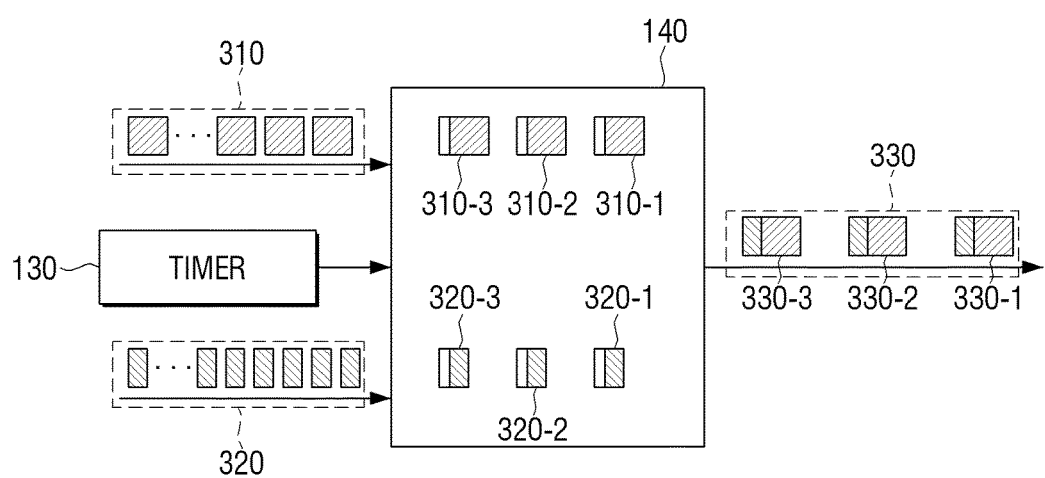
FIG. 3 is a view illustrating generation of corrected image data based on motion information and image data input into a cover photography apparatus according to an exemplary embodiment.

FIG. 3 is a view illustrating generation of corrected image data based on a motion information and image data input into a cover photography apparatus according to an exemplary embodiment.

As illustrated in FIG. 3, a plurality of image data 310 photographed through the photographer 120 and a plurality of motion information 320 received from the portable terminal apparatus 200 may be input into the controller 140. When at least one of a first image data 310-1 and first motion information 320-1 of the plurality of image data 310 and the plurality of motion information 320 is initially input, the timer 130 performs a counting operation according to a control command of the controller 140. As such, with the counting operation being performed through the timer 130, the controller 140 analyzes the plurality of motion information 320 input and determines whether there is an information on a motion when a motion event occurred.

When it is determined that the first to third motion information 320-1~320-3 indicate a motion event, the controller 140 obtains a counting value counted at a point when each of the first to third motion information 320-1~320-3 was detected. Furthermore, the controller 140 may obtain an image data 310 input at the point when each of the first to third motion information 320-1~320-3 was input. As illustrated, at a point when each of the first to third motion information 320-1~320-3 was detected during a motion event, first to third image data 310-1~310-3 may be input, respectively. Therefore, the controller 140 may determine the first to third image data 310-1~310-3 as the image data captured during a motion event.

As such, when the counting value of the point when each of the first to third motion information 320-1~320-3 was detected and the first to third image data 310-1~310-3 are determined as the image data input corresponding to the first to third motion information 320-1~320-3, the controller 140 grants the pre-obtained counting value to the first to third motion information 320-1~320-3, and the first to third image data 310-1~310-3 corresponding to each of the first to third motion information 320-1~320-3.

Therefore, to the first image data 310-1 and first motion information 320-1, a first counting value obtained at a point when the first motion information 320-1 was detected may be correlated, and to the second image data 310-2 and second motion information 320-2, a second counting value obtained at a point when the second motion information 320-2 was detected may be correlated. Furthermore, to the third image data 310-3 and the third motion information 320-3, a third counting value obtained at a point when the third image data 310-3 was detected may be correlated.

As such, when a counting value is correlated to each of the first to third image data 310-1~310-3 and each of the first to third motion information 320-1~320-3, the controller 140 may generate corrected image data including the image data and motion information to which a same counting value has been correlated. That is, the controller 140 may generate a first corrected image data 330-1 including the first image data 310-1 and first motion information 320-1 to which the first counting value has been correlated, generate a second corrected image data 330-2 including the second image data 310-2 and second motion information 320-2 to which the second counting value has been correlated, and generate a third corrected image data 330-3 including the third image data 310-3 and third motion information 320-3 to which the third counting value has been correlated. When these first to third corrected image data 330-1~330-3 are generated, the controller 140 may transmit the corrected data to the portable terminal apparatus 200 through the communicator 110.

Accordingly, the portable terminal apparatus 200 may correct the first to third image data 310-1~310-3 based on the first to third motion information 320-1~320-3 included in each of the first to third corrected image data 330-1~330-3 received from the cover photography apparatus 100, and display a live image according thereto on the screen.

Figure 4:
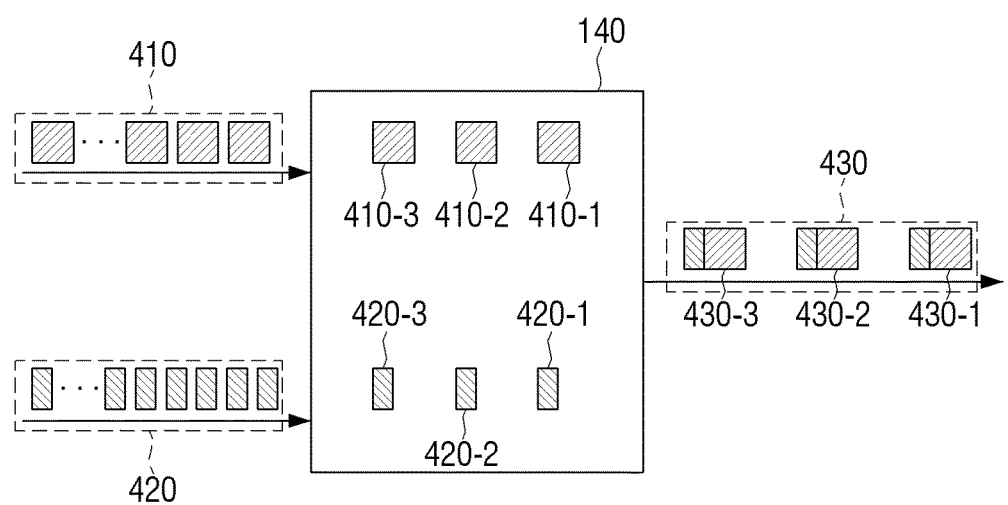
FIG. 4 is a view illustrating generation of corrected image data based on motion information and image data input into a cover photography apparatus according to another exemplary embodiment.

FIG. 4 is a view illustrating generation of corrected image data based on a motion information and image data input into a cover photography apparatus according to another exemplary embodiment.

As illustrated in FIG. 4, the controller 140 may receive a plurality of image data 410 photographed through the photographer 120 and a plurality of motion information 420 received from the portable terminal apparatus 200 through the communicator 110. When the plurality of image data 410 are input, the controller 140 analyzes the plurality of motion information 420 input, and determines whether there is an information on a motion when a motion event occurred.

When it is determined that a first to third motion information 420-1~420-3 indicate a motion event, the controller 140 may determine each of a first to third image data 410-1~410-3 input at a point when the first to third motion information 420-1~420-3 was input as an image data input corresponding to the first to third motion information 420-1~420-3.

As such, when the first to third motion information 420-1~420-3 and the image data input at the point when the first to third motion information 420-1~420-3 were detected are determined as the first to third image data 410-1~410-3, the controller 140 may generate a first corrected image data 430-1 including the first motion information 420-1 and the first image data 410-1 input at the point when the first motion information 420-1 was detected. Furthermore, the controller 140 may generate a second corrected image data 430-2 including the second motion information 420-2 and the second image data 410-1 input at the point when the second motion information 420-2 was detected. Furthermore, the controller 140 may generate a third corrected image data 430-3 including the third motion information 420-3 and the third image data 410-3 input at the point when the third motion information 420-3 was detected. When these first to third corrected image data 430-1~430-3 are generated, the controller 140 may transmit the corrected data to the portable terminal apparatus through the communicator 110.

Accordingly, the portable terminal apparatus 200 may correct the first to third image data 410-1~410-3 based on the first to third motion information 420-1~420-3 included in each of the first to third corrected image data 430-1~430-3 received from the cover photography apparatus 100, and display a live image according thereto on the screen.

Figure 5:
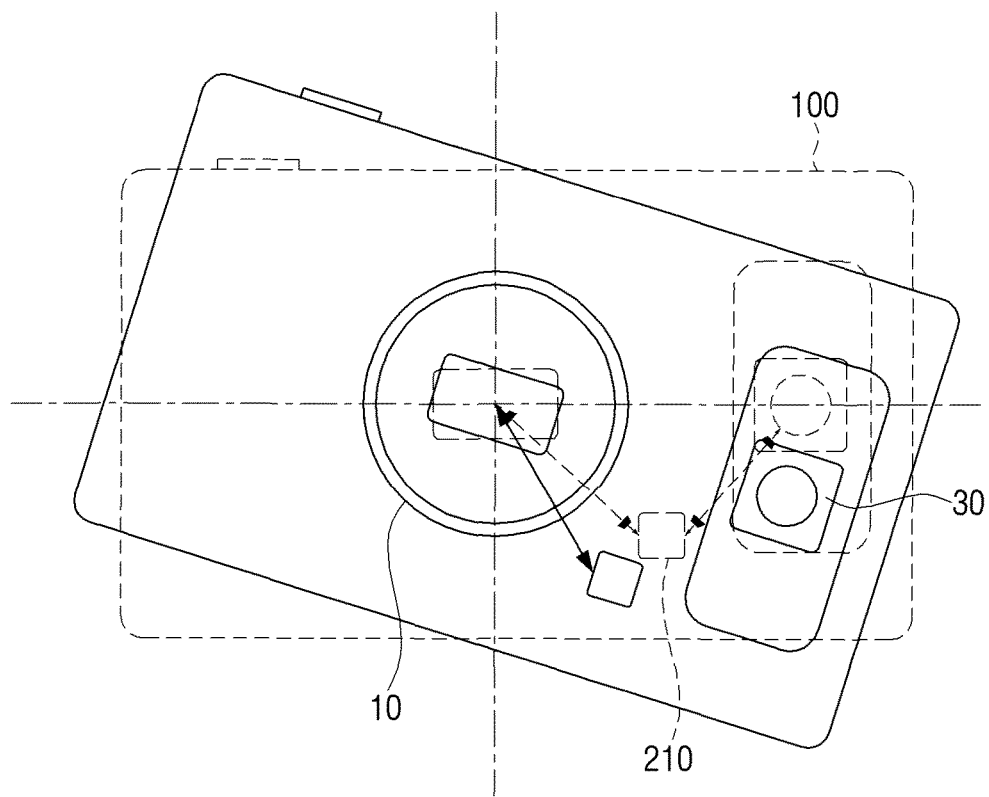
FIG. 5 is a view illustrating receiving corrected data according to inclination from a cover photography apparatus to which a portable terminal apparatus is connected.

FIG. 5 is an exemplary view illustrating receiving a corrected data according to generation of inclination from a portable terminal apparatus in a cover photography apparatus to which the portable apparatus is connected.

As illustrated in FIG. 5, the cover photography apparatus 100 to which the portable terminal apparatus 200 is connected may operate in an activation mode according to a photographing command. While operating in the activation mode related to photography, the cover photography apparatus 100 may be inclined with respect to a target object to the photographer. The inclination may be, for example, due to hand trembling that occurs when the user is photographing the target object.

When such an inclination occurs, the portable terminal apparatus 200 may compute an inclination value of the cover photography apparatus 100 based on an information on a pre-defined distance between the sensor 210 for sensing a motion and an image sensor of the photographer 10 of the cover photography apparatus 100, and a motion information sensed through the sensor 210. When such an inclination value is computed, the portable terminal apparatus 200 transmits a corrected data that includes the computed inclination value to the cover photography apparatus 100, and the controller 140 may generate corrected image data based on the corrected data together with the synchronized image data and motion information.

Figure 6:
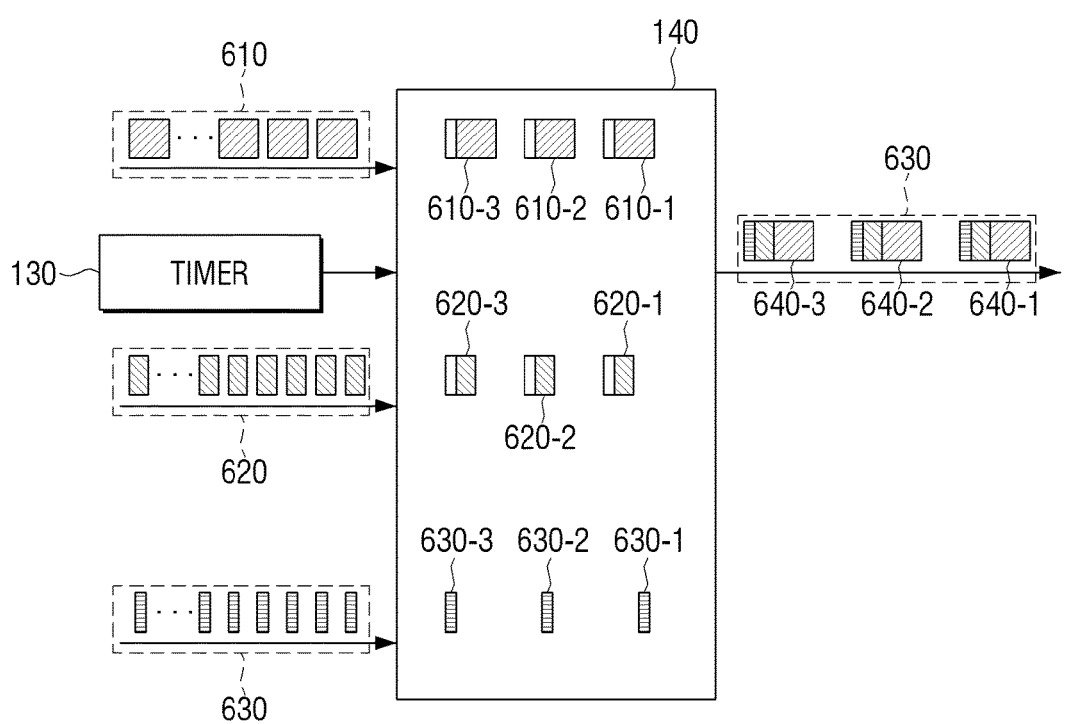
FIG. 6 is a view illustrating generation of corrected data in a cover photography apparatus according to another exemplary embodiment.

FIG. 6 is a view illustrating generation of corrected image data in a cover photography apparatus according to another exemplary embodiment.

As illustrated in FIG. 6, the controller 140 may receive a plurality of image data 610, a plurality of motion information 620 received from the portable terminal apparatus 200, and a plurality of corrected data 630. Herein, each of the plurality of corrected data 630 may be information generated at a point when each of the plurality of motion information 620 was detected. Meanwhile, when at least one of a first image data 610-1 and first motion information 620-1 of the plurality of image data 610 and the plurality of motion information 620 is initially input, the timer 130 performs a counting operation according to a control command of the controller 140. As such, with the counting operation being performed through the timer 130, the controller 140 may analyze the plurality of motion information 620 input and determine whether there is an information on a motion when a motion event occurred.

When it is determined that the first to third motion information 620-1~620-3 are motion information where a motion event occurred, the controller 140 obtains a counting value counted at a point when each of the first to third motion information 620-1~620-3 was detected. Furthermore, the controller 140 may obtain an image data 610 input at a point when each of the first to third motion information 620-1~620-3 was input. As illustrated, the first to third image data 610-1~610-3 may be input at a point when each of the first to third motion information 620-1~620-3 was detected.

Therefore, the controller 140 may determine the first to third image data 610-1~610-3 as image data input regarding the first to third motion information 620-1~620-3 detected correspond to the motion event. Then, the controller 140 correlates a counting value counted at a point when each of the first to third image data 610-1~610-3 was detected to each of the first to third image data 610-1~610-3 and the first to third image data 610-1~610-3. Then, the controller 140 may generate corrected image data that includes the image data and motion information to which the same counting value has been correlated, and corrected data input in response to the motion information.

That is, the controller 140 may generate first corrected image data 640-1 that includes first image data 610-1 and first motion information 620-1 to which a first counting value has been correlated, and first corrected data 630-1 input in response to the first motion information 620-1. Furthermore, the controller 140 may generate second corrected image data 640-2 that includes second image data 610-1 and second motion information 620-2 to which a second counting value has been correlated and second corrected data 630-2 input in response to the second motion information 620-2. Furthermore, the controller 140 may generate third corrected data 640-3 that includes third image data 610-3 and third motion information 620-3, and third corrected data 630-3 input in response to the third motion information 620-3.

When these first to third corrected image data 640-1~640-3 are generated, the controller 140 may transmit the corrected data to the portable terminal apparatus 200 through the communicator 110.

Accordingly, the portable terminal apparatus 200 may correct the first to third image data 610-1~610-3 based on each of the first to third motion information 620-1~620-3 and the first to third corrected data 630-1~630-3 included in the first to third corrected image data 640-1~640-3 received from the cover photography apparatus 100, and display the live image according thereto on the screen.

So far, an operation for generating corrected image data on image data photographed based on a motion information and corrected data received from the portable terminal apparatus 100 connected to the cover photography apparatus 200 in the cover photography apparatus 100 was explained in detail. Hereinbelow, each component of the portable terminal apparatus 200 that is connected to the cover photography apparatus 100 and that performs operations will be explained in detail.

Figure 7:
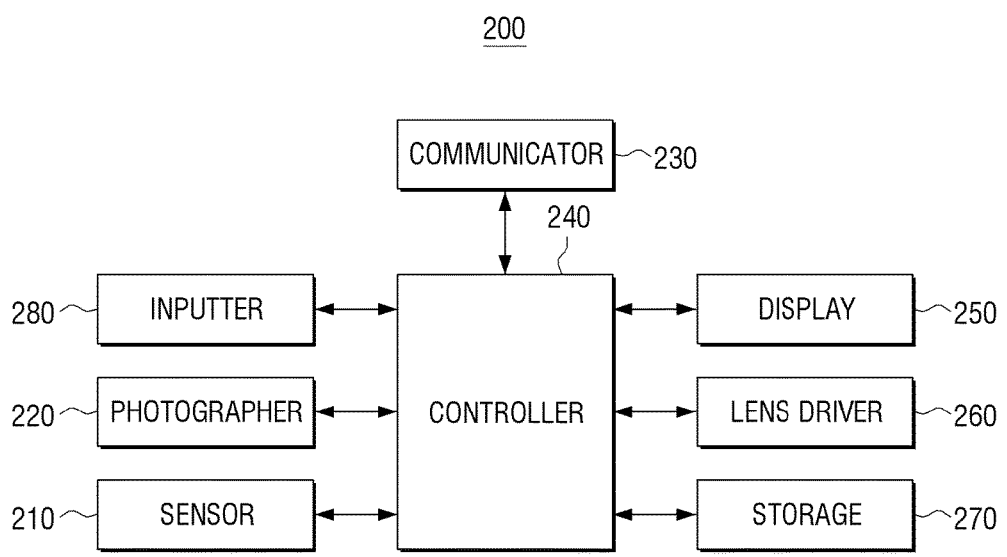
FIG. 7 is a block diagram of a portable terminal apparatus according to an exemplary embodiment.

FIG. 7 is a block diagram of a portable terminal apparatus according to an exemplary embodiment.

As illustrated in FIG. 7, the portable terminal apparatus 200, such as a smart phone and tablet PC capable of photographing an image, includes a sensor 210, photographer 220, communicator 230 and controller 240. The portable terminal apparatus 200 may further include an inputter 280, display 250, lens driver 260, and storage 270.

The sensor 210 is a component configured to sense a motion of the portable terminal apparatus 200 and detect a motion information according thereto. The sensor 210 may be a gyro sensor according to an exemplary embodiment.

The photographer 220 is a means for photographing an image. The photographer 220 converts an external light entered through a lens 30 into an electric signal. Herein, the lens 30 may be a wide-angle photographing lens embedded in the portable photography apparatus 200, and may be driven according to a driving command of the lens driver 260. When the portable terminal apparatus 200 is connected to the aforementioned cover photography apparatus 100, the lens driver 260 may drive a lens 10 formed in the cover photography apparatus 100. When an external light entered through the lens 30 is incident on a photographing surface, such a photographer 220 uses an image sensor, such as a CCD (Charge Coupled Device) and CMOS (Complementary Metal Oxide Semiconductor), to convert the external light incident on the photographing surface into an electric signal. Therefore, the controller 440 image-processes image data corresponding to the electric signal converted through the photographer 220, generates a live image corresponding to a subject for photography, and displays the generated live image through the display 250.

When connected to the cover photography apparatus 100, the communicator 230 performs wired or wireless data communication with the cover photography apparatus 100. Such a communicator 230 may transmit a plurality of motion information sensed through the sensor 210 to the cover photography apparatus 100, and receive corrected image data generated from the cover photography apparatus 100.

According to the exemplary embodiment, the communicator 230 may be realized as a short communication module that includes at least one of a WiFi direct communication module, Bluetooth module, IrDA (infrared data association) module, NFC(Near Field Communication) module, and Zigbee module.

However, there is no limitation thereto, and thus the communicator 230 may be realized as not only a short distance communication module, but also a remote communication module that includes at least one of a cellular communication module 3G (3rd generation) mobile communication module, 4G (4th generation) mobile communication module, and 4G LTE (Long Term Evolution) communication module.

Meanwhile, when the portable terminal apparatus 200 and cover photography apparatus 100 are physically connected, the communicator 230 may include a USB module, and may be physically connected to a USB module provided in the cover photography apparatus 100 to transmit a control command related to photography or motion information, and may receive corrected image data generated in the cover photography apparatus 100.

With the cover photography apparatus 100 and portable terminal apparatus 200 connected to each other, when a photographing command regarding the cover photography apparatus 100 is input through the inputter 280, the controller 240 controls the communicator 230 to transmit motion information sensed through the sensor 210 to the cover photography apparatus 100. Herein, the controller 240 may transmit a corrected data generated based on the motion information sensed through the sensor 210 and information on a distance between the image sensor of the photographer 120 and the sensor 210 to the cover photography apparatus 100 together with the motion information. Herein, the information on the distance between the image sensor of the photographer 120 of the cover photography apparatus 100 and the sensor 210 may be pre-stored in the storage 270.

Meanwhile, the inputter 280 that receives a photographing command may include at least one button. Furthermore, the inputter 280 may receive a touch command regarding image photographing through a touch screen disposed on the display 250.

The display 250 may display at least one of an image data photographed through the photographer 220 and an image data photographed through the cover photography apparatus 100. To this end, the display 250 may include a plurality of areas. According to the exemplary embodiment, in the case of displaying an image data photographed through the photographer 220 and an image data photographed through the cover photography apparatus 100 at the same time, the display 250 may display a live image corresponding to the image data photographed through the photographer 220 on a first area, and display a live image corresponding to the image data photographed through the cover photography apparatus 100 on a second area. Meanwhile, in the case of displaying a live image corresponding to image data photographed through one of the photographer 220 and cover photography apparatus 100, the display 250 may display one live image on a single area.

Not only that, the display 250 may display a first area for displaying a first control UI for receiving a control command related to photography of the photographer 220, and a second control UI for receiving a control command related to photography of the photographer 120 of the cover photography apparatus 100. Therefore, the user may input control commands regarding the portable terminal apparatus 200 and cover photography apparatus 100 through the first and second control UI each displayed on the first and second areas.

Meanwhile, when the image data photographed through the photographer 220 is input, the controller 240 corrects the input image data based on correction data determined based on motion information at a point when the image data was photographed and information on a distance between the image sensor of the photographer 220 and the sensor 210. Accordingly, the display 250 may display a corrected live image corresponding to the image data photographed through the photographer 220 on a first area or single area. Herein, the information on a distance between the image sensor of the photographer 220 and the sensor 210 may be pre-stored in the storage 270.

Meanwhile, when the corrected image data is received from the cover photography apparatus 100, the controller 240 determines whether the image data of the received corrected image data is a corrected image data. That is, the controller 240 determines whether the received corrected image data is an uncorrected source data that includes the image data, motion information and correction data. When it is determined as a corrected image data, the display 250 may display a live image corresponding to the corrected image data on a second area of single area.

Meanwhile, when the received corrected image data is an uncorrected source data, the controller 240 corrects the image data based on the motion information and correction data included in the received uncorrected source data. Accordingly, the display 250 may display a corrected live image corresponding to the image data photographed in the cover photography apparatus 100 on a second area or single area.

Hereinbelow, a control method of a cover photography apparatus according to an exemplary embodiment will be explained in detail.

Figure 8:
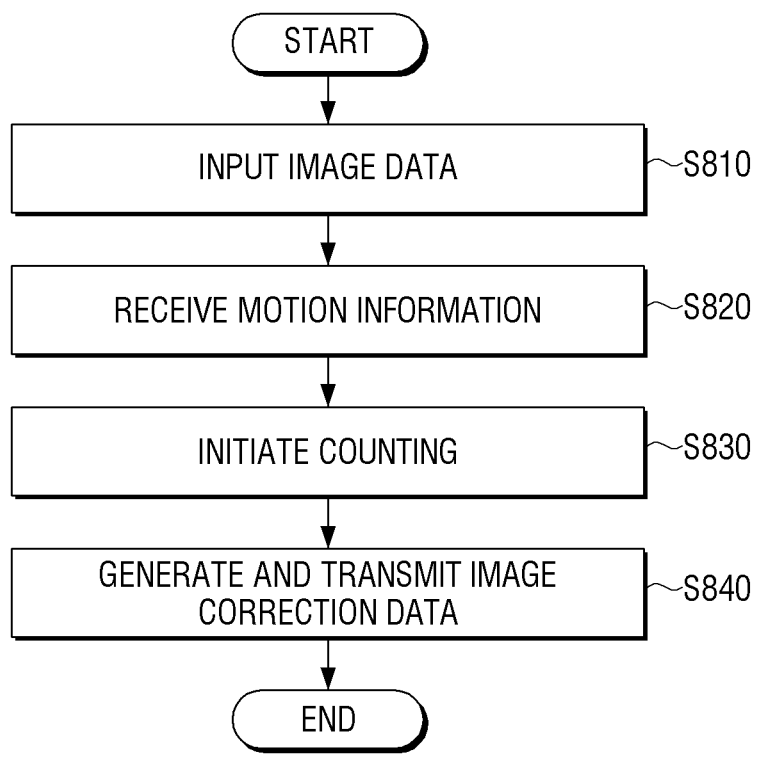
FIG. 8 is a flowchart of a control method of a cover photography apparatus according to an exemplary embodiment.

FIG. 8 is a flowchart of a control method of a cover photography apparatus according to an exemplary embodiment.

As illustrated in FIG. 8, when a photographing command is input from the portable terminal apparatus 200 with the cover photography apparatus 100 connected to the portable terminal apparatus 200 and initiated wired or wireless data communication, the cover photography apparatus 100 may be activated in a photographing mode. As such, when activated in the photographing mode, the cover photography apparatus 100 receives an image data photographed through an activated photographing module (S810). Meanwhile, when a photographing command corresponding to the cover photography apparatus 100 is input, the portable terminal apparatus 200 connected to the cover photography apparatus 100 transmits information on a motion sensed through the sensor to the cover photography apparatus 100. Accordingly, when the information on the motion is received from the portable terminal apparatus 200, the cover photography apparatus 100 performs a counting operation at a point when at least one of the information on the motion received and the image data photographed by the photographing module is initially input (S820, S830).

Then, the cover photography apparatus 100 analyzes a plurality of motion information input to detect an information on a motion when a motion event occurred, and synchronizes the detected motion information with an image data input at a point when the motion information was detected based on a counting value of the point when the motion information was detected to generate corrected image data.

Hereinbelow, a method for generating corrected image data in the cover photography apparatus 100 according to the present disclosure will be explained in detail.

FIG. 9 is a flowchart of the method for generating corrected image data in the cover photography apparatus according to an exemplary embodiment.

As illustrated in FIG. 9, with a counting operation initiated through the timer, the cover photography apparatus 100 analyzes the plurality of motion information received from the portable terminal apparatus 200 and detects an information on a motion when a motion event occurred (S910). When at least one information on a motion when a motion event occurred is detected of the plurality of motion information, the cover photography apparatus 100 obtains a counting value of a point when the motion information was detected (S920). Then, the cover photography apparatus 100 obtains the detected motion information and an image data input at the point when the motion information was detected, and correlates the pre-obtained counting value to the detected motion information and the image data obtained corresponding to the motion information (S930). Then, the cover photography apparatus 100 synchronizes the motion information with the image data to which the same counting value was correlated to generate corrected image data (S940).

When the corrected image data is generated through the aforementioned series of processes, the cover photography apparatus 100 transmits the generated corrected image data to the portable terminal apparatus 100 (S840).

Herein, the corrected image data may be the image data synchronized with the motion information and corrected based on the synchronized motion information or an uncorrected source data that includes the synchronized motion information and the image data.

Therefore, when the corrected image data received from the cover photography apparatus 100 is a corrected image data, the portable terminal apparatus 100 may display a live image corresponding to the corrected image on the screen without additional correction. Meanwhile, when the received corrected image data is an uncorrected source data, the portable terminal apparatus 100 may correct the image data based on the motion information included in the uncorrected source data, and display a live image according thereto on the screen.

Meanwhile, at the aforementioned step S820, the cover photography apparatus 100 may further receive a corrected data computed based on information on a distance between the image sensor included in the photographing module that photographs an image through the portable terminal apparatus 200 and the sensor that detects motion information, and the motion information detected by the sensor. When such a corrected data is input, at the aforementioned step S940, the cover photography apparatus 100 may generate corrected image data that includes the motion information and image data to which the same counting value was correlated, and the corrected data input at the point corresponding to the motion information. In this case, the corrected image data may be the image data synchronized with the motion information and corrected based on the synchronized motion information or an uncorrected source data that includes the synchronized motion information and the image data.

Therefore, when the corrected image data received from the cover photography apparatus 100 is a corrected image data, the portable terminal apparatus 100 may display a live image corresponding to the corrected image data on the screen without additional correction. Meanwhile, when the received corrected image data is an uncorrected source data, the portable terminal apparatus 100 may correct the image data based on the motion information and corrected data included in the uncorrected source data, and display a live image according thereto on the screen.

Although a few exemplary embodiments have been shown and described, it would be appreciated by those skilled in the art that changes may be made without departing from the principles and spirit of the present disclosure, the scope of which is defined in the claims and their equivalents.

What is claimed is:

1. A cover photography apparatus comprising:
   an imaging device configured to obtain image data;
   a communicator configured to, in response to a portable terminal apparatus being connected, perform communication with the portable terminal apparatus;
   a timer configured to obtain time values; and
   a controller configured to:
      in response to a command for image capturing being input, control the imaging device to obtain an image data by capturing an image and receive, through the communicator, motion information from the portable terminal apparatus;
      identify, by analyzing the motion information, a time value which represents a time that the motion information is input among a plurality of time values which are obtained by the timer;
      integrate the time value into the motion information and into a corresponding image data which is obtained at the time value corresponding to the motion information;
      synchronize the motion information with the corresponding image data;
      obtain corrected image data based on the received motion information and the corresponding image data; and
      control the communicator to transmit the corrected image data to the portable terminal apparatus.

2. The apparatus according to claim 1, wherein the communicator is further configured to receive correction data based on the motion information and a distance between an image sensor of the imaging device and a sensor configured to detect the motion information from the portable terminal apparatus, and
   the controller is further configured to generate the corrected image data based on the correction data.

3. The apparatus according to claim 2, wherein the corrected image data is corrected based on the synchronized corresponding motion information and the corrected motion data, or the uncorrected source data that includes the synchronized corresponding motion information, the image data and the corrected motion data.

4. The apparatus according to claim 1, further comprising:
   a housing configured to connect to the portable terminal apparatus such that one surface of the portable terminal apparatus is accessible to the user, and comprising a hole configured to expose a lens of the connected portable terminal apparatus; and
   a lens formed on one surface of the housing, and configured to be protrudable outside the housing,
   wherein the communicator is further configured to receive a driving signal and the lens is driven according to the driving signal.

5. The apparatus according to claim 1, wherein the corrected image data is corrected based on the synchronized corresponding motion information or an uncorrected source data that includes the synchronized corresponding motion information and the corresponding image data.

6. A portable terminal apparatus comprising:
   an imaging device configured to generate image data;
   a sensor configured to generate motion information of the portable terminal apparatus;
   a communicator configured to perform data communication with a cover photography apparatus in response to the cover photography apparatus being connected; and
   a controller configured to control the communicator, in response to a photograph command being input to the portable terminal apparatus and the motion information being generated, to transmit the motion information and a command for image capturing to the cover photography apparatus,
   wherein the cover photography apparatus is configured to:
      identify, by analyzing the motion information, a time value which represents a time that the motion information is input among a plurality of time values which are obtained by a timer;
      integrate the time value into the motion information and into a corresponding image data which is obtained at the time value corresponding to the motion information;
      synchronize the motion information with the corresponding image data; and
      obtain corrected image data based on the motion information and the corresponding image data.

7. The apparatus according to claim 6,
   wherein the controller is further configured to:
      determine correction data based on the motion information and a distance between an image sensor of the imaging device and the sensor; and
      control the communicator to transmit the correction data.

8. The apparatus according to claim 6,
   further comprising a display configured to display an image based on at least one of the image data from the imaging device and received image data from the cover photography apparatus,
   wherein the controller is further configured to:
      in response to the image data from the imaging device being input, correct the input image data based on correction data determined based on motion information corresponding to a time the image data was photographed and a distance between an image sensor of the imaging device and the sensor, and control the display to display the same; and
      in response to receiving the uncorrected source data that includes the image data, motion information, and corrected data from the cover photography apparatus, correct the image data based on the motion information and corrected data included in the uncorrected source data, and control the display to display the same.

9. The apparatus according to claim 8, wherein the display comprises a first area for displaying a first control user interface for receiving a first control command related to the imaging device, and a second area for displaying a second control user interface for receiving a second control command related to the cover photography apparatus.

10. The apparatus according to claim 6, wherein the corrected image data is corrected based on a synchronized corresponding motion information or an uncorrected source data that includes the synchronized corresponding motion information and the corresponding image data.

11. A method of controlling a cover photography apparatus, the method comprising:
performing communication with a portable terminal apparatus in response to the portable terminal apparatus being connected;
in response to a command for image capturing being input, obtaining an image data, and receiving motion information from the portable terminal apparatus;
identifying, by analyzing the motion information, a time value which represents a time that the motion information is input among a plurality of time values which are obtained by a timer;
integrating the time value into the motion information and into a corresponding image data which is obtained at the time value corresponding to the motion information;
synchronizing the motion information with the corresponding image data;
obtaining corrected image data based on the motion information and the corresponding image data; and
transmitting the obtained corrected image data to the portable terminal apparatus.

12. The method according to claim 11, wherein the receiving further comprises receiving correction data based on the motion information and a distance between an image sensor of an imaging device and a sensor configured to detect the motion information from the portable terminal apparatus, and
the generating further comprises generating corrected image data including the correction data.

13. The method according to claim 12, wherein the corrected image data is corrected based on the synchronized corresponding motion information and the corrected motion data or the uncorrected source data that includes the synchronized corresponding motion information, the image data, and the corrected motion data.

14. The method according to claim 11, wherein the cover photography apparatus is connected to the portable terminal apparatus such that a surface of the portable terminal apparatus is exposed through a housing formed such that a lens formed on the portable terminal apparatus is exposed, and
the receiving, in response to a lens of the housing protruding outside the housing according to a driving signal received from the portable terminal apparatus, further comprises capturing image data through a photographer.

15. The method according to claim 11, wherein the corrected image data is corrected based on a synchronized corresponding motion information or an uncorrected source data that includes the synchronized corresponding motion information and the corresponding image data.

* * * * *